United States Patent [19]

Kolb

[11] 4,251,751
[45] Feb. 17, 1981

[54] STARTING CIRCUIT FOR A SPLIT SECTION GAS DISCHARGE LASER

[75] Inventor: William P. Kolb, Carlsbad, Calif.

[73] Assignee: Hughes Aircraft Company, Culver City, Calif.

[21] Appl. No.: 79,403

[22] Filed: Sep. 27, 1979

[51] Int. Cl.³ .......................................... H05B 41/30
[52] U.S. Cl. ................................. 315/171; 315/337; 331/94.5 PE
[58] Field of Search ............... 331/94.5 PE; 315/167, 315/169.1, 171, 337

[56] References Cited

U.S. PATENT DOCUMENTS

| | | | |
|---|---|---|---|
| 3,317,853 | 5/1967 | George | 331/94.5 PE |
| 3,460,053 | 8/1969 | Leonard | 331/94.5 PE |
| 3,611,183 | 10/1971 | Fendley | 331/94.5 PE |
| 4,156,208 | 5/1979 | Sasnett | 331/94.5 PE |

*Primary Examiner*—Eugene R. La Roche
*Attorney, Agent, or Firm*—Robert M. Wallace; William H. MacAllister

[57] ABSTRACT

In an ignition circuit for a split section gas discharge laser having a common anode, a positive sustaining voltage is applied to the common anode while independent negative starting potentials are applied through high resistances to cathodes at either end of the laser tube which are grounded through diodes to prevent shorting of the ignition voltage source while providing a return path for the sustaining voltage source. The cathodes are immediately brought to ground potential upon ignition so that gas discharge in each of the two sections may be independently ignited while mirrors at either end of the laser tube are maintained at or near ground potential during operation of the laser after ignition.

21 Claims, 5 Drawing Figures

STARTING CIRCUIT FOR A SPLIT SECTION GAS DISCHARGE LASER

TECHNICAL FIELD

This invention is an improved starting circuit for a laser, and in particular for a gas discharge laser having split sections.

BACKGROUND OF THE INVENTION

Gaseous discharge waveguide lasers such as carbon dioxide ($CO_2$) lasers are well known in the art. Such lasers are typically constructed by providing a sealed tube having parallel mirrors at each end of the tube, and an anode and a cathode. For a laser discharge tube length of 8 cm (for example), discharge of the $CO_2$ gas mixture in the tube may be initiated by applying a 15 kilovolt (kV) potential between the anode and the cathode. After initiation of the gas discharge, a 7 kV sustaining potential is maintained between the anode and the cathode while the 15 kV starting potential is removed. It should be recognized by those skilled in the art that the sustaining and starting potentials are a function of the discharge length and therefore, for different lengths, different potentials must be applied. Application of voltages substantially in excess of 15 kV can cause insulation breakdown of external cables or of the anode and cathode. Therefore, for gas discharge lasers of substantially longer length, the laser tube is divided into a plurality of sections, each section having its own anode and cathode, so that the ignition voltage does not have to be increased above 15 kV with an increase in the length of the gas discharge tube. This arrangement is not ideal because the space between adjoining anodes or cathodes of adjacent sections is occupied by cold gas which does not contribute to the power output of the laser and, furthermore, absorbs energy from the optical beam of the laser. Also, it is difficult to maintain a sealed vacuum within the laser tube because the increased number of anodes and cathodes increases the number of required seals.

The foregoing disadvantages are now being overcome by permitting the two adjoining sections to share a common anode which is grounded. If the laser is divided into two sections, a cathode is disposed at either end of the laser tube while a grounded common anode is located in the middle of the laser tube, thus eliminating the wasted space between individual anodes of adjoining sections. A high voltage ignition source and a sustaining voltage source are applied to each cathode at either end of the laser tube. Because the parallel aligned laser mirrors are also located at either end of the laser tube, a high voltage is induced on each of the mirrors due to the close proximity of the high voltage cathodes, presenting a severe inconvenience whenever the mirrors must be adjusted during laser operation. However, the high voltage induced on the mirrors may be eliminated as a source of inconvenience by grounding the two cathodes and applying high voltage instead to the common anode in the middle of the laser tube. Although in this latter arrangement the laser mirrors may be conveniently adjusted because they reside at ground potential, the two laser sections sharing the common anode will no longer reliably start upon application of the 15 kV ignition voltage to the common anode. This is because the two discharge sections of the laser do not start simultaneously. The high voltage source is typically a capacitive discharge device of the type well known in the art which is pulled to ground potential by the flow of current in the tube upon ignition of the gas in either one of the two sections. Therefore, when one section has ignited upon application of the ignition voltage, the voltage appearing between the electrodes is no longer sufficient to start the other section, so that only one section of the laser will be active, the other section remaining dormant. This problem may be overcome by attempting to ignite the laser in an excessive number of attempts until both sections start simultaneously by chance. However, the unreliability of this procedure is highly inconvenient

SUMMARY OF THE INVENTION

The foregoing problems are overcome in this invention, which is an ignition circuit for a split section gas discharge laser having a common anode. In this invention (using specific values for sake of a concrete example only), a sustaining voltage of 7 kV is applied to the common anode. However, instead of increasing the potential on the common anode to 15 kV during ignition, a negative 12 kV starting potential is applied to each cathode at either end of the tube. The cathodes are immediately brought to ground potential upon ignition. Independent ignition voltage sources are applied to each section of the split section laser so that the laser may be reliably started, while the mirrors at either end of the laser tube are maintained at or near ground potential during operation of the laser after ignition. Each cathode is connected through a high resistance path to a $-12$ kV ignition source and is also connected to ground through a diode. The high resistance path is typically 1000 megohms. The combination of the $-12$ kV on each cathode and the $+7$ kV on the common anode provides an increased ignition potential of 19 kV, which is greater than the ignition potentials achieved in the prior art. Because each section has its own starting source, both sections of the split section laser will always start upon application of the ignition voltage sources to the cathodes.

After the ignition of the gas discharge laser, current flows between the anode and the two cathodes, producing a voltage drop in the high resistance which is great enough to virtually remove the 12 kV starting potential from each cathode. The current in the gas discharge tube is returned from the cathode through each diode to ground. Significantly, the diode prevents shorting of the high voltage ignition source to ground while permitting it to be attached to the grounded cathode.

This invention therefore realizes all of the advantages which were desirable in the prior art but which were not achievable in a single starting circuit. Specifically, the dead space between adjacent anodes of a split section laser is eliminated by use of a common anode, while high voltage is prevented from reaching the laser mirrors by maintaining the cathodes at either end of the laser discharge tube at or near ground potential during operation, while permitting the application of independent high voltage ignition sources to each of the cathodes to provide reliable starting of the laser. Another advantage realized in this invention is that, whereas in the prior art 15 kV was applied onto either the common anode or the two cathodes in order to start the split section laser, only 12 kV are applied to each cathode and 7 kV applied to the common anode during ignition in the present invention, thus significantly reducing the amount of voltage which has to be applied to an individual electrode while increasing the total ignition potential between cathode and anode from 15 kV to 19 kV, further enhancing the reliability of the starting circuit and decreasing the probability of insulation breakdown.

DESCRIPTION OF THE FIGURES

This invention is best understood by reference to the accompanying drawings of which.

DETAILED DESCRIPTION OF THE INVENTION

Figure 1:
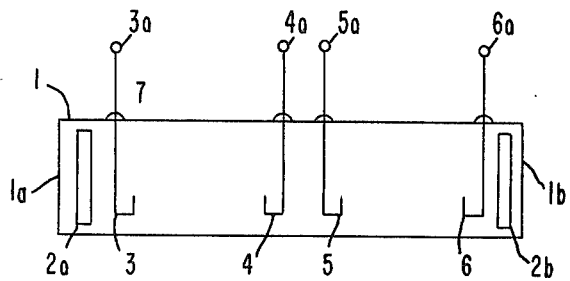
FIG. 1 is a schematic diagram of a prior art ignition circuit for a split section gas discharge laser.

Referring to FIG. 1, a prior art split section gas discharge laser includes a laser tube 1 having two ends 1a, 1b, and a pair of parallel mirrors 2a, 2b located at the two ends. The tube 1 is filled with a suitable gas, such as carbon dioxide, and is divided into two sections defined by a first pair of electrodes 3, 4 and a second pair of electrodes 5, 6. Each of the electrodes 3, 4, 5, 6 is connected to a terminal 3a, 4a, 5a, 6a, respectively by conductors passing through seals 7 on the laser tube 1 maintaining a vacuum inside the tube 1. Each electrode pair, 3, 4 and 5, 6 comprise an anode and a cathode. For example, electrode 3 may be a cathode while the electrode 4 may be an anode which is maintained at a higher voltage than the cathode, or vice versa. A +7 kV sustaining voltage is continuously applied to the anode, which is temporarily increased to 15 kV in order to initiate gas discharge. Alternatively, a −7 kV sustaining potential may be continuously applied to the cathode, which is temporarily increased to −15 kV during ignition. Gas discharge occurs between the electrodes 3 and 4 and also occurs between the electrodes 5 and 6. Preferably, the electrodes 4 and 5 are both anodes, and each of them is connected to a sustaining voltage source of 7 kV, which is increased to 15 kV during starting, while the cathodes 3 and 6 adjacent the mirrors 2a and 2b are maintained at ground potential. The arrangement illustrated in FIG. 1 has several disadvantages, including the use of a relatively large number of seals 7, which degrades the vacuum integrity of the tube 1. Another disadvantage is that the dead space between the anodes 4 and 5 is occupied by gas which is not ionized and does not emit power, but instead remains as a cold gas which causes a loss in power output by absorbing energy from the remaining gas in the tube 1. Another problem is that, due to instabilities, gas discharge may occur between anodes and cathodes of adjacent sections, for example, between the cathode 3 and the anode 5, thus bypassing the anode 4 and reducing the total power output from the gas inside the laser tube 1.

Figure 2:
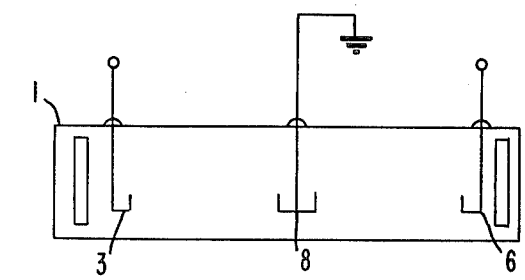
FIG. 2 is a schematic diagram of a second prior art ignition circuit for a split section gas discharge laser.

The dead space between adjacent anodes is eliminated in the prior art arrangement illustrated in FIG. 2, in which the adjacent anodes 4 and 5 are replaced by a common anode 8 which is maintained at ground potential, while the cathodes 3 and 6 are attached to high voltage sources to provide −7 kV sustaining potential which is temporarily increased to −15 kV during ignition. In the arrangement illustrated in FIG. 2, independent ignition voltage sources may be applied to each of the split sections through the individual cathodes 3 and 6 so that both sections of the laser tube 1 will ignite independently and reliably. However, a severe disadvantage is that the mirrors 2a and 2b are maintained at a high voltage by virtue of their close proximity to the cathodes 3 and 6, thus making it highly inconvenient to adjust alignment of the mirrors 2a and 2b during laser operation.

Figure 3:
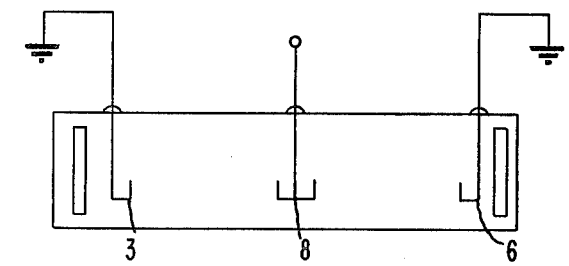
FIG. 3 is a schematic diagram of a third prior art ignition circuit for a split section gas discharge laser.

In order to remove the high voltage from the mirrors 2a and 2b, the two cathodes 3 and 6 may be grounded as illustrated in FIG. 3 and the high voltage may be applied through the common anode 8 to both split sections defined between the common anode 8 and the cathodes 3 and 6. However, the ignition circuit illustrated in FIG. 3 will not ignite the laser reliably. In particular, because the ignition source is preferably a capacitive discharge device, if the gas between the cathode 3 and the common anode 8 discharges before the gas between the cathode 6 and the common anode 8, the high voltage ignition source will be effectively removed by current flow between the cathode 3 and anode 8, so that the voltage applied to the anode 8 is reduced to the lower sustaining voltage 7 kV and is no longer of sufficient magnitude to ignite the gas between the cathode 6 and the anode 8. Thus, only one of the two split sections will ignite in most instances, and the action of the starting circuit will therefore be highly unreliable. It is well known to those skilled in the art that ignition of carbon dioxide gas discharge lasers is enhanced by cosmic rays incident on the gas molecules inside the tube 1. In most instances one of the two split sections will always receive a higher flux of cosmic rays than the other section during any instant of time in a random manner. Therefore it is highly improbable that both of the split sections will ignite upon application of an ignition voltage of 15 kV to the common anode 8. Typically, lasers of the type illustrated in FIG. 3 are started by making a randomly large number of attempts to initiate gas discharge in both sections of the laser until ignition is achieved simultaneously in both sections, which is a time consuming procedure.

Figure 4:
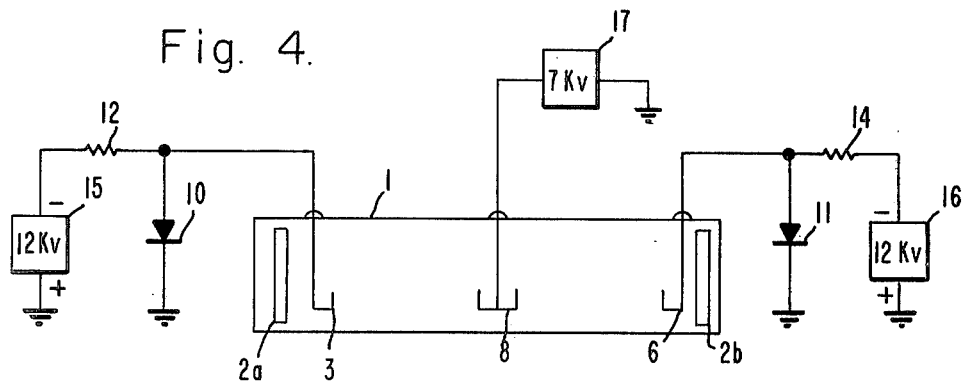
FIG. 4 is a schematic diagram of the ignition circuit for a split section gas discharge laser of the present invention.

The foregoing disadvantages are eliminated in the present invention, which is illustrated in the schematic diagram of FIG. 4. The laser tube 1 encloses laser mirrors 2a, 2b which are maintained at ground potential after ignition of the gas in the tube 1 by connection of the cathodes 3 and 6 adjacent the mirrors 2a, 2b to ground through diodes 10 and 11, respectively. A positive 7 kV sustaining voltage is applied to the common anode 8 while independent negative 12 kV sources are applied to the cathodes 3, 6 through resistance paths which are simply shown in FIG. 4 as resistors 12 and 14, respectively. The ignition circuit illustrated in FIG. 4 performs several tasks, including isolating the 12 kV ignition voltage sources from the remainder of the circuit after ignition of gas discharge inside the tube 1 and preventing shorting of the 12 kV ignition sources to ground while permitting connection of the cathodes 3 and 6 to ground. The limiting resistors 12 and 14 perform the task of isolating the 12 kV ignition sources from the remainder of the circuit after ignition of gas discharge. Resistors 12 and 14 preferable have a resistance of greater than approximately 10 megohms. When power is first applied to the circuit of FIG. 4, the gas inside the tube 1 does not immediately discharge, so that there is no current path between the cathode 3 and the anode 8 or the cathode 6 and the anode 8, and thus there is no voltage drop across the resistors 12 and 14. Therefore, a full 12 kV is applied from the ignition sources 15 and 16 through the limiting resistors 12 and 14 to the cathodes 3 and 6, respectively. The diodes 10 and 11 are reverse biased at this time, and prevent the ignition voltage sources 15 and 16 from being shorted to ground. Simultaneously, a sustaining voltage source 17 applies +7 kV to the common anode 8, so that, prior to ignition, the total potential between the common anode and the two cathodes 3 and 6 is 19 kV as soon as power is applied to the circuit. This voltage is sufficient to cause gas discharge between the common anode 8 and the cathodes 3 and 6. Even though gas discharge may occur between the common anode and either one of the two cathodes at different times, both sections of the split section laser tube 1 will eventually discharge because each section receives a 12 kV ignition potential from the independent voltage sources 15 and 16, neither of which is substantially affected by gas discharge in the other's section.

As soon as gas discharge is achieved inside the laser tube 1, current flows from the ignition sources 15 and 16 through the limiting resistors 12 and 14, respectively. However, the resistance of the limiting resistors 12 and 14 and the corresponding voltage drop across them is so high that the voltage applied through these resistors to the cathodes 3 and 6, respectively, is approximately zero. The 7 kV sustaining source 17 causes a current flow from the positive anode 8 to the negative cathodes 3 and 6 which is returned through ground through the diodes 10 and 11. Therefore, the cathodes 3 and 6 are maintained at ground potential immediately upon ignition of the gas inside the tube 1 so that the mirrors 2a and 2b are also maintained at ground potential by virtue of their location adjacent the cathodes 3 and 6, respectively.

Operation of the circuit of FIG. 4 begins by simultaneous application of power to the sustaining voltage source 17 and the ignition voltage sources 15 and 16. Negative 12 kV is applied through the limiting resistors 12 and 14 through the cathodes 3 and 6, respectively, while +7 kV is applied to the common anode 8 so that an anode-to-cathode potential of 19 kV exists in each of the two split sections. After a finite amount of time has elapsed, the gas inside the tube 1 has been sufficiently ionized between the common anode and the two cathodes so that gas discharge occurs and current flows between the common anode 8 and the two cathodes 3 and 6. This causes a current to flow from the ignition voltage sources 15 and 16 through the limiting resistors 12 and 14, respectively. The resulting voltage drop in the resistors 12 and 14 is sufficient to virtually remove the 12 kV potential from the cathodes 3 and 6 so that these cathodes revert to ground potential immediately upon initiation of gas discharge in the tube 1. As discussed previously, gas discharge may not be initiated simultaneously in each of the two sections separated by the common anode 8, but this does not affect the operation of the circuit of FIG. 4 because the use of independent ignition voltage sources 15 and 16 assures that initiation of gas discharge in each of the split sections separated by the common anode 8 is independent of gas discharge in the other section. As soon as the potential on the cathodes 3 and 6 is at ground potential, the anode-to-cathode potential falls 19 kV to 7 kV, which is sufficient to sustain the gas discharge previously initiated. Electrons flow from the grounded cathodes 3 and 6 to the anode 8 and are returned by the sustaining voltage supply 17 through the diodes 10 and 11 to the cathodes 3 and 6, respectively.

Figure 5:
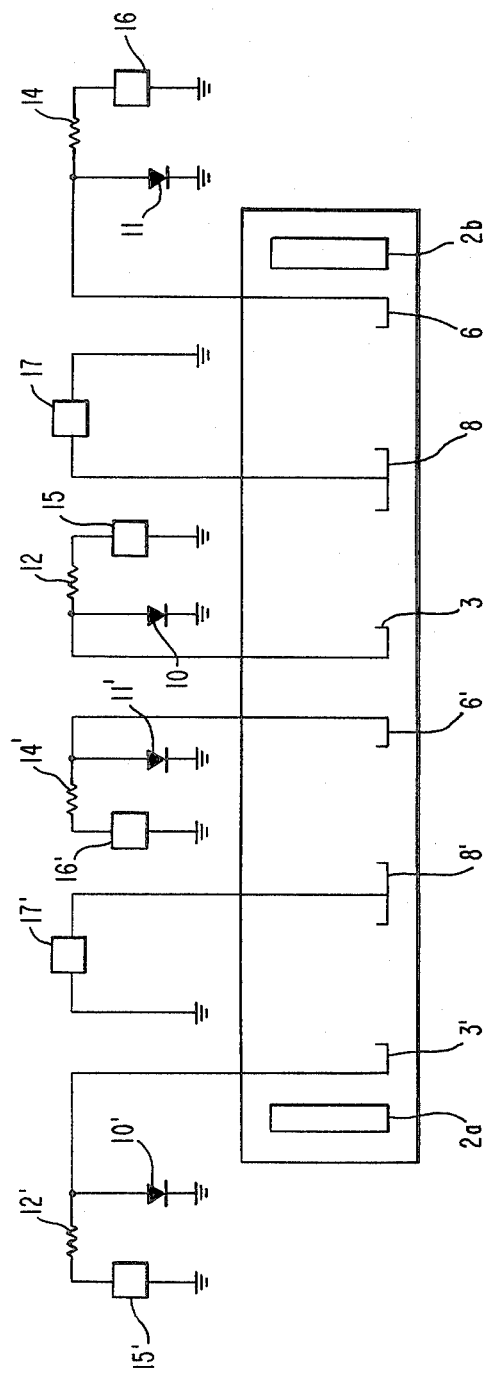
FIG. 5 illustrates an alternative embodiment of the invention in which a split section gas discharge laser includes a plurality of split sections of the type illustrated in FIG. 4.

FIG. 5 illustrates an alternative embodiment of the invention in which a plurality of laser sections of the type illustrated in FIG. 4 are disposed between the mirrors 2a and 2b at either end of the laser tube 1. Thus, embodiment of FIG. 5 includes a first split section laser portion 3, 6, 8, 10, 11, 12, 14, 15, 16 and 17 and a second laser section 3', 6', 8', 10', 11', 12', 14', 15', 16' and 17', both sections being identical to the split section laser illustrated in FIG. 4.

Thus, this invention provides a significant advance in the art of split section gas discharge lasers by providing independent starting sources for each of the split laser sections while at the same time maintaining the laser mirrors at the two ends of the laser tube at ground potential. It should be recognized that other variations of the starting circuit of the present invention which are not disclosed in this specification are possible which do not depart from the true scope of the present invention. For example, the polarities of the various voltage sources illustrated in FIG. 4 may be reversed, along with a suitable reversal of the polarities of the two diodes 10 and 11. It is further contemplated that the circuit may be useful as a starting circuit for other discharge tubes not described in this specification, and such use falls within the scope of the present invention.

What is claimed is:

1. An ignition circuit for a split section gas discharge laser having a gas filled tube and a common anode shared by two cathodes, comprising:

a sustaining voltage source applied to said common anode;

a first ignition voltage source;

a first resistor connected between said ignition voltage source and one of said cathodes;

a first diode connected between said one cathode and ground so as to block current flow from said ignition voltage source to ground;

a second ignition voltage source;

a second resistor connected between said second ignition voltage source and the other of said cathodes; and a second diode connected between said other cathode and ground so as to block current flow from said second ignition source to ground, wherein the resistances of said first and second resistors are of sufficient magnitude to substantially isolate said first and second ignition sources from said cathodes, respectively, upon initiation of gas discharge in said laser.

2. The device of claim 1 wherein the resistance of said first resistor and the resistance of said second resistor are in the range of 10 to 100 meg-ohms.

3. The device of claim 1 wherein said sustaining voltage source applies a positive voltage to said anode.

4. The device of claim 1 wherein said first and secnd ignition voltage sources apply a negative voltage to said two cathodes.

5. The device of claim 3 wherein said sustaining voltage source supplies approximately +7 kV.

6. The device of claim 5 wherein said first and second ignition sources supply approximately −12 kV.

7. The device of claim 1 wherein said laser tube is filled with carbon dioxide gas.

8. The device of claim 1 wherein said cathodes are disposed at either end of said laser tube, and said laser encloses a pair of laser mirrors disposed adjacent said first and second cathodes, said mirrors being maintained near ground potential after initiation of gas discharge during operation of said laser.

9. The device of claim 1 wherein the voltage supplied by said first ignition voltage source is substantially unaffected by gas discharge between the other of said cathodes and said common anode.

10. The device of claim 1 wherein the voltage supplied by said second ignition voltage source is substantially unchanged by gas discharge between said one cathode and said common anode.

11. An ignition circuit for a gas discharge laser having a gas filled tube and a common first electrode shared by a pair of second electrodes to provide two cathode-to-anode discharge paths, comprising:

a sustaining voltage source applied to said common first electrode;

a first ignition voltage source;

a first resistor connected between said first ignition voltage source and one of said second electrodes;

a first diode connected between said one second electrode and ground so as to block current flow from said first ignition voltage source to ground while providing a return current path for said sustaining voltage source;

a second ignition voltage source;

a second resistor connected between said second ignition voltage source and the other of said second electrodes; and a second diode connected between said other second electrode and ground so as to block current flow from said second ignition source to ground while providing a return current path for said sustaining voltage, wherein the resistances of said first and second resistors are of sufficient magnitude to substantially isolate said first and second ignition sources respectively from said second electrodes upon initiation of gas discharge between said first and second electrodes.

12. The circuit of claim 11 wherein said common first electrode is an anode and said pair of second electrodes are a pair of cathodes sharing said common anode.

13. The circuit of claim 12 wherein said sustaining voltage source applies a positive voltage to said common anode having sufficient magnitude to sustain discharge of the gas between said anode and said pair of cathodes already ignited.

14. The circuit of claims 12 or 13 wherein said first and second ignition voltage sources apply negative voltages to said pair of cathodes having sufficient magnitudes to ignite gas discharge between said common anode and said pair of cathodes.

15. The circuit of claim 11 further comprising first and second laser mirrors adjacent said pair of second electrodes.

16. The device of claim 11 wherein said common first electrode is a common cathode and said pair of second electrodes are a pair of anodes sharing said common cathode.

17. The device of claim 16 wherein said sustaining voltage source applies a negative voltage to said common cathode having sufficient magnitude to sustain discharge of the gas between said common cathode and said pair of anodes already ignited.

18. The device of claims 16 or 17 wherein said first and second ignition voltage sources apply positive voltages to said pair of anodes having sufficient magnitudes to ignite gas discharge between said common cathode and said pair of anodes.

19. The device of claim 11 further comprising an additional set of electrodes adjacent said first and second electrodes, said additional electrode set comprising a common third electrode shared by a pair of fourth electrodes, said circuit further comprising:

a sustaining voltage source applied to said common third electrode;

a third ignition voltage source;

a third resistor connected between said third ignition voltage source and one of said fourth electrodes;

a third diode connected between said one second electrode and ground so as to block current flow from said third ignition voltage source to ground while providing a return current path for said second sustaining voltage source;

a fourth ignition voltage soruce;

a fourth resistor connected between said fourth ignition voltage source and the other of said fourth electrodes; and a fourth diode connected between said other fourth electrode and ground so as to block current flow from said fourth ignition voltage source to ground while providing a return current path for said sustaining voltage source, wherein the resistances of said third and fourth resistors are of sufficient magnitude to substantially isolate said third and fourth ignition voltage sources respectively from said fourth electrodes upon ignition of gas discharge between said first and second electrodes.

20. The device of claim 19 wherein said first and third common electrodes are both common anodes and said pair of second electrodes and said pair of fourth electrodes comprise first and second cathode pairs, respectively, sharing said first and third common anode electrodes, respectively.

21. The device of claim 19 wherein one of said first and third common electrodes comprises a common anode, the other comprising common cathode, and a corresponding one pair of said second and fourth electrode pairs comprise a pair of cathodes sharing said common anode, the other pair comprising a pair of anodes sharing said common cathode.

* * * * *